United States Patent
Howell et al.

(10) Patent No.: US 7,821,227 B2
(45) Date of Patent: *Oct. 26, 2010

(54) MOTOR VEHICLE BATTERY DISCONNECT CIRCUIT HAVING ELECTRONIC DISCONNECTS

(75) Inventors: Clayton M. Howell, Fort Wayne, IN (US); John D. Jervis, Fort Wayne, IN (US); H. Edward Kelwaski, Craigville, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/565,861

(22) Filed: Sep. 24, 2009

(65) Prior Publication Data

US 2010/0013302 A1 Jan. 21, 2010

Related U.S. Application Data

(62) Division of application No. 11/536,959, filed on Sep. 29, 2006, now Pat. No. 7,612,524.

(51) Int. Cl.
*H02J 7/14* (2006.01)
(52) U.S. Cl. .................. 320/104; 320/134; 320/163
(58) Field of Classification Search ............. 320/104, 320/162, 163, 158, 132, 134; 324/427
See application file for complete search history.

(56) References Cited

U.S. PATENT DOCUMENTS

| 5,871,858 | A | 2/1999 | Thomsen et al. | |
|---|---|---|---|---|
| 6,377,031 | B1* | 4/2002 | Karuppana et al. | 323/220 |
| 6,417,668 | B1 | 7/2002 | Howard et al. | |
| 6,768,350 | B1 | 7/2004 | Dickey | |
| 6,836,094 | B1 | 12/2004 | Bender | |
| 7,612,524 | B2* | 11/2009 | Howell et al. | 320/104 |
| 2004/0263123 | A1* | 12/2004 | Breen et al. | 320/128 |
| 2007/0080662 | A1* | 4/2007 | Wu | 320/110 |

* cited by examiner

*Primary Examiner*—Edward Tso
*Assistant Examiner*—Aaron Piggush
(74) *Attorney, Agent, or Firm*—Jeffrey P. Calfa; Mark C. Bach

(57) ABSTRACT

An electronic disconnect switch module (12) in a motor vehicle has one or more pairs of high-current, high-side solid state switch devices (30A, 30B, 32A, and 32B). The source terminal of one device of each pair is connected to vehicle load circuits (27), the source terminal of the other device of each pair is connected to the vehicle battery bank (16), and the drain terminals of the devices of each pair are connected in common. The module also has a microcontroller (34) that interfaces the switch devices with the vehicle electrical system. Four feature groups are provided: Vehicle Electrical System Protection, Battery Charge Control, Battery Disconnect, and Battery Monitoring.

10 Claims, 7 Drawing Sheets

MOTOR VEHICLE BATTERY DISCONNECT CIRCUIT HAVING ELECTRONIC DISCONNECTS

FIELD OF THE INVENTION

This invention relates generally to electrical systems of motor vehicles. More particularly, the invention relates to battery disconnect devices and circuits for preventing battery drain that can occur, for example, when an engine-driven alternator does not operate for an extended period of time due to the engine being shut off and therefore is unable to maintain battery charge.

BACKGROUND OF THE INVENTION

Certain motor vehicles, heavy trucks that are powered by diesel engines for example, may be parked for extended periods of time. If the engine is allowed to keep running after a truck has been parked, the alternator should be effective to keep the truck's battery bank charged. If the engine is shut down, either intentionally by the driver, or automatically by a device such as an idle shutdown timer, while the circuits for electric devices remain on, the battery bank will begin to drain through those circuits. For example, an ignition switch will typically remain on after an idle shutdown timer has timed out, and certain circuits that are fed through the ignition switch and may have been left on may continue to draw current.

Because the battery bank must be able to provide sufficient current for cranking the engine at starting, the battery bank of a diesel-powered heavy truck typically comprises multiple storage batteries ganged together in parallel. If the battery bank is allowed to drain to the point where it cannot deliver the large cranking current necessary for starting the engine, the vehicle cannot be operated. Because a heavy truck may be parked for an extended period of time, it is therefore appropriate to guard against the possibility that its battery bank will be drained to a point that will not allow the engine to be started or cranked due to failure to turn off all its electric circuits.

Consequently, it is known to place a disconnect switch in circuit between the battery bank and the rest of the vehicle electrical system for use in disconnecting the battery bank from the electrical system to prevent battery current draw that, if allowed to continue long enough, could drain the battery bank to the point of preventing the engine from being cranked and started.

Commonly owned U.S. Pat. No. 6,836,094 discloses an example of a battery disconnect circuit that has the advantage of a direct, switch-free connection of the battery bank to the cranking motor so that when the cranking motor solenoid is energized to crank the motor, cranking current flows directly from the battery bank to the cranking motor windings, and not through the disconnect switch.

Battery disconnect switches are typically electromechanical devices, not solid-state devices. The solid-state counterparts of certain electromechanical devices can often, but not always, provide significant advantages in performance and/or function and/or cost. Sometimes no comparable solid-state counterpart exists for an electromechanical device. For various reasons electromechanical devices continue to enjoy significant usage in the automotive industry, and it is believed reasonable to include battery disconnect switches in that category.

When an electromechanical battery disconnect switch fails, it is typically replaced, but sometimes it is simply bypassed for expediency. The inherent nature of such a switch seems to render it poorly suited for interfacing with vehicle electrical systems that have become largely electronic over the past several decades. Consequently, electronic monitoring of such switches for diagnostic, data collection, and other various purposes appears to have been largely ignored.

SUMMARY OF THE INVENTION

The present invention is believed to represent an advance in motor vehicle electrical system technology through employing known solid-state devices in a unique way to create an electronic battery disconnect switch module that provides the benefits of solid-state construction and that enables versatile interfacing with a vehicle's electrical system, a capability apparently previously unavailable with electromechanical battery disconnect switches.

The solid-state devices that form the inventive disconnect switch within the module are sometimes known as "high-current, high-side" switches. An example of such a device is one sold by Freescale Semiconductor, Inc. (Models 33982 and 33982B).

The exemplary module possesses its own processing features and an interface that allows data communication with a vehicle's own processing system. These attributes of the module endow an electronic battery disconnect switch with certain multi-function capabilities that are useful in battery voltage monitoring, rate-of-charge control, and circuit protection, all while still fulfilling the basic purpose of avoiding battery draining to the point of preventing the engine from being cranked and started. The exemplary embodiments to be described here show a novel configuration of high-current, high-side switches associated with a microprocessor in the module that provide functions by four feature groups referred to for convenience as: Vehicle Electrical System Protection; Battery Charge Control; Battery Disconnect; and Battery Monitoring. The solid-state switches perform the Feature Group functions through the microcontroller interface with the vehicle's electrical system. The microcontroller contains all necessary algorithms to perform the tasks contemplated by the Feature Group functions, principally handling/controlling load current through the solid-state switches and reporting diagnostic information.

Vehicle Electrical System Protection is intended to protect the entire electrical system of the vehicle and all electrical circuits/components on the vehicle from "reverse battery" and "double battery" jump-start conditions.

Battery Charge Control controls the rate of charge from the engine-driven alternator to the battery bank.

Battery Disconnect disconnects the battery bank from the vehicle electrical system through either automatic or manual operation as described hereinafter.

Battery Monitoring uses a method described in U.S. Pat. No. 6,417,668 to determine the battery condition in the battery bank.

The use of high-current, high-side semiconductor switches as the disconnect elements, with appropriate cooling techniques for solid-state devices that carry large electrical currents, can improve quality, reliability, and life expectancy of battery disconnect switches while at the same time providing additional diagnostic and protection features to vehicle electrical system. Improved quality, reliability, and life expectancy are achieved through a combination of the low "on resistance" of the semiconductor switches and effective control of their operating temperature.

Through the four feature groups described above, the invention is capable of measuring and reporting net battery current, battery charge current, and net battery voltage. An additional advantage will be the ability to detect and protect the vehicle batteries from excess drain. Once the battery drain threshold has been reached, the switches will shut off current to the current-draining electrical loads automatically to ensure enough residual battery charge capacity for engine cranking and starting. Still another advantage provided by the invention is protecting vehicle electrical systems from abnormal voltage events, such as a reverse battery connection and 24V jump-start applied to a 12V system. The invention can also monitor and log occurrence of such events for use in fleet management or maintenance.

The disclosed embodiment of inventive disconnect switch module contains two inputs that allow the use of low current input signals. One input signal is a manual disconnect input, thus allowing this device to act as a Master Disconnect Switch as required by certain industry standards. The other input signal is a reset input that can reset the disconnect switch module from off (disconnected) to on (connected). The reset signal is applied to the disconnect switch module by a reset switch that is accessible to the driver. The disconnect switch module also has a high-side output, connected to an indicator, such as an LED that may even be built into the reset switch, for signaling the driver that the disconnect switch module is off and has disconnected the battery bank from the vehicle electrical loads. The reset switch provides a mechanism to power up the vehicle electrical system after the disconnect switch module has disconnected the vehicle battery bank because of an event described in the feature group.

All of the information that the inventive disconnect switch module collects is made available on a standard vehicle datalink (SAE Standard J1939). Other electronic devices on the vehicle datalink, such as the Vehicle Body Controller, the Electronic Gauge Cluster (EGC) and the Aware™ Module, can request this information as needed from the inventive disconnect switch module.

Because the inventive disconnect switch module is on the vehicle datalink, certain devices such as the International Aware™ Module have the ability to command and control certain aspects of disconnect switch functionality for purposes such as theft avoidance/deterrence, fleet management and general maintenance. The Aware™ Module is a data collection and communications system that, when installed into a vehicle, can gather diagnostic, prognostic and vehicle location information, primarily from the SAE J1939 data link and various sensors connected to the module.

One example of an installation for a battery disconnect switch involves the use of two heavy conductors, one to connect the battery terminal of the disconnect switch to a terminal of the battery bank, such as the positive terminal in a negative ground electrical system, and another to connect the load terminal of the disconnect switch to a distribution point for the electrical system load, with the alternator output terminal being connected to the load terminal of the disconnect switch.

Another example of an installation for a battery disconnect switch is like the one described but with the alternator connected to the battery terminal of the disconnect switch. In each of these two examples, the path for cranking current flow from the battery bank to the starting motor is switch-free.

The inventive disconnect switch module is disclosed here in use in each of those two examples.

One general aspect of the invention relates to an engine-powered land vehicle comprising an engine, a drivetrain through which the engine propels the vehicle on land, a battery bank comprising one or more D.C. storage batteries, an electric starter motor that draws current from the battery bank to crank the engine at starting, and electric load circuits that are fed from the battery bank through a disconnect switch.

The disconnect switch comprises one or more pairs of high-current, high-side solid state switch devices. The devices of each pair each comprise a solid-state switch comprising a source terminal and a drain terminal providing a conduction path through the switch. The source terminal of one device of each pair is connected to the load circuits, the source terminal of the other device of each pair is connected to the battery bank, and the drain terminals of the devices of each pair are connected in common. The high-current, high-side solid state switch devices are associated with a microcontroller in a disconnect switch module. It is through the microcontroller that the module interfaces with the vehicle electrical system.

Another aspect of the invention relates to a disconnect switch module for disconnecting a battery bank from an electrical load upon occurrence of certain conditions. The module comprises one or more pairs of high-current, high-side solid state switch devices, the devices of each pair each comprising a solid-state switch comprising a source terminal and a drain terminal providing a conduction path through the switch, the source terminal of one device of each pair being connected to the load circuits, the source terminal of the other device of each pair being connected to the battery bank, and the drain terminals of the devices of each pair being connected in common. This arrangement provides a bi-directional conduction capability through each pair of devices.

Still another aspect of the invention relates to a method for protecting a battery bank having one or more D.C. storage batteries in an electrical system of an engine-powered land vehicle against loss of charge that renders the battery bank incapable of operating an electric starter motor that draws current from the battery bank to crank the engine at starting. The electrical system has electric load circuits that are fed from the battery bank through a disconnect switch module that comprises controlled conduction solid-state switch devices through which current can bi-directionally flow between the battery bank and the electric load circuits.

The method comprises processing data relevant to operation of the solid-state switch devices and developing from that processed data control data for controlling the solid-state switches to either a) limit charge current to the battery bank to a defined charge current limit without regulating battery bank voltage, b) regulate battery bank voltage to a first defined limit of regulation when charge current is within a defined range immediately below the defined charge current limit, or c) regulate battery bank voltage to a second defined limit of regulation that is less than the first defined limit of regulation when charge current is less than the defined range.

The foregoing, along with further aspects, features, and advantages of the invention, will be seen in the following disclosure of a presently preferred embodiment of the invention depicting the best mode contemplated at this time for carrying out the invention. The disclosure includes drawings, briefly described as follows.

DESCRIPTION OF THE PREFERRED EMBODIMENT

Figure 1:
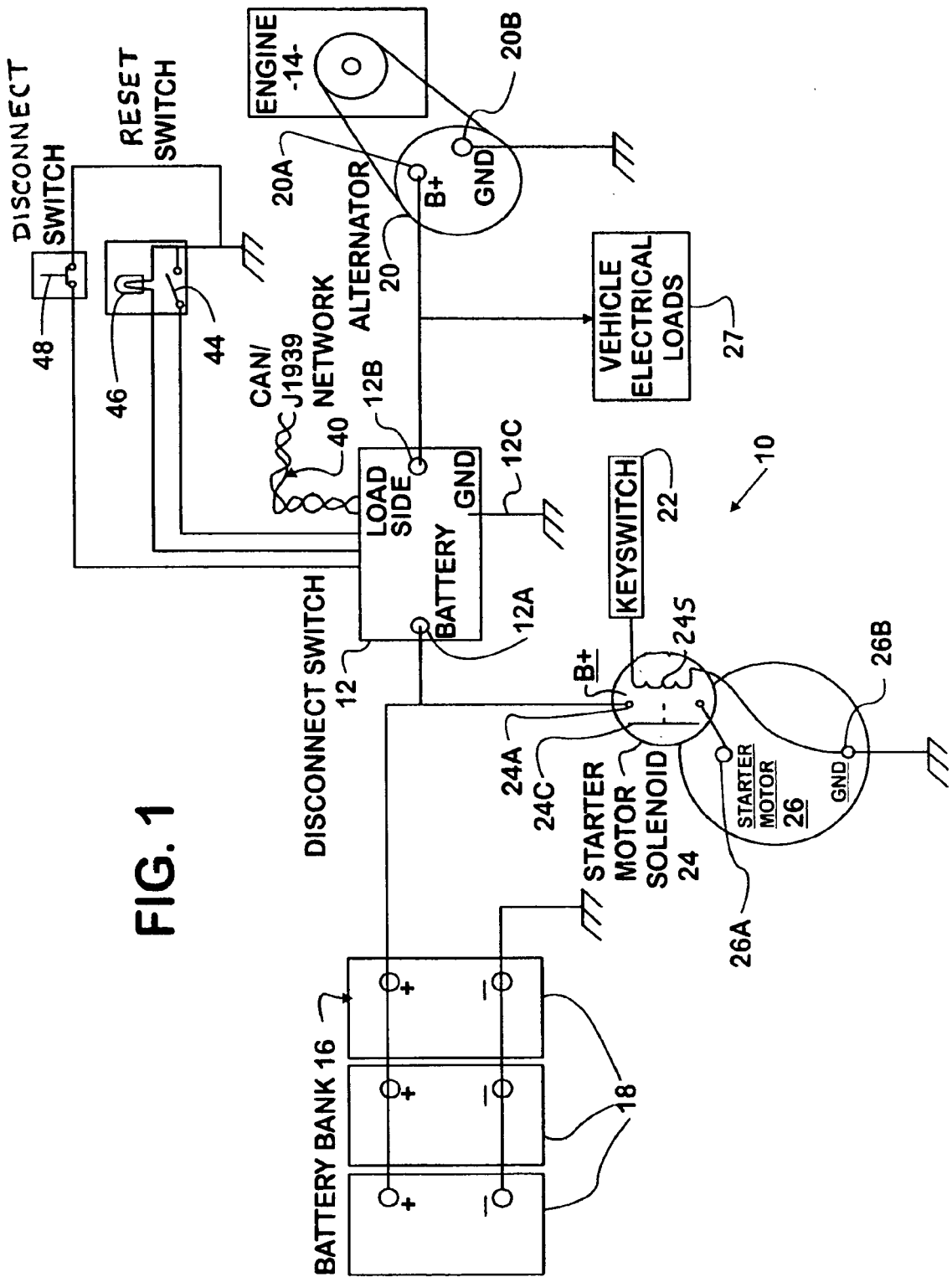
FIG. 1 is a schematic electric circuit diagram of a first embodiment of the present invention in a motor vehicle electrical system.

FIG. 1 shows a portion of a motor vehicle electrical system 10 that incorporates an electronic disconnect switch module 12 in accordance with principles of the present invention. While the particular example of motor vehicle shown is a truck powered by a diesel engine 14, principles of the invention can be applied to various vehicles where use of a disconnect switch is desired.

Electrical system 10 comprises a battery bank 16 containing one or more individual D.C. storage batteries 18. In a heavy truck powered by a diesel engine, battery bank 16 contains multiple batteries 18 ganged together as shown. When engine 14 is running, batteries 18 are kept charged by an engine-driven alternator 20 having positive and negative terminals 20A, 20B. Terminal 20A is connected to a terminal 12B on the load side of switch module 12, and the positive battery terminals are connected to a terminal 12A on the battery side of the switch module.

Running of the engine is under the control of a switch that is typically key-operated, keyswitch 22, and that is commonly referred to as an ignition switch, even in a vehicle whose engine relies on compression of fuel in the engine cylinders for ignition rather than on spark ignition.

FIG. 1 depicts a positive voltage electrical system where the negative battery terminals are grounded, as is alternator terminal 20B, and where the positive battery terminals are connected to one terminal 24A of a starter motor solenoid 24 for operating an electric starter motor 26 for cranking engine 14 at starting.

Solenoid 24 may be integrated with starter motor 26 so that other than terminal 24A, the only external terminals of the combined devices to which conductors attach are a common ground terminal 26B and a terminal for energizing a coil 24S of solenoid 24 that is in circuit between keyswitch 22 and ground terminal 26B. Solenoid 24 further comprises an armature that is operated by coil 24S and that carries a contact 24C.

When coil 24S is not energized, as shown in FIG. 1, contact 24C does not bridge terminal 24A to an internal terminal that is connected internally of the combined devices to a terminal 26A of motor 26. When coil 24S is energized, contact 24C connects the positive battery bank terminals to motor terminal 26A so that cranking current can operate motor 26, thereby cranking engine 14.

The truck electrical system comprises various load circuits, designated generally by the reference 27 as Vehicle Electrical Loads. A brief description of various loads is given here. A more detailed description can be read in U.S. Pat. No. 6,836,094.

One or more fuse blocks are mounted at any suitable location or locations on either the interior or exterior of the truck cab. A fuse block contains multiple circuit protection devices, such as fuses and/or circuit breakers, for distributing current to individual circuits in the vehicle. The fuse blocks are battery-fed through disconnect switch 12, and one battery-fed circuit allows keyswitch 22 to operate motor 26 for cranking engine 14.

In addition to the group of circuits that are battery-fed, a second group of circuits are accessory-fed, and a third group are ignition-fed. In general, battery-fed circuits are those that are appropriate for operation when keyswitch 22 is in OFF position, although the switch is itself battery-fed. Accessory-fed circuits are those for operating various accessory-type devices whose operation, while not essential for engine starting and running, is appropriate when the engine is not running, but nonetheless require use of a key to operate switch 22 from OFF position. Any load that the accessory circuits may be imposing on the batteries is removed when the engine is being cranked. Ignition-fed circuits are those for operating various devices whose operation is called for when the engine is running or being started.

The placement of disconnect switch module 12 allows the circuit between battery bank 16 and cranking motor terminal 24A to be switch-free, providing important advantages that are described in U.S. Pat. No. 6,836,094.

Figure 2:
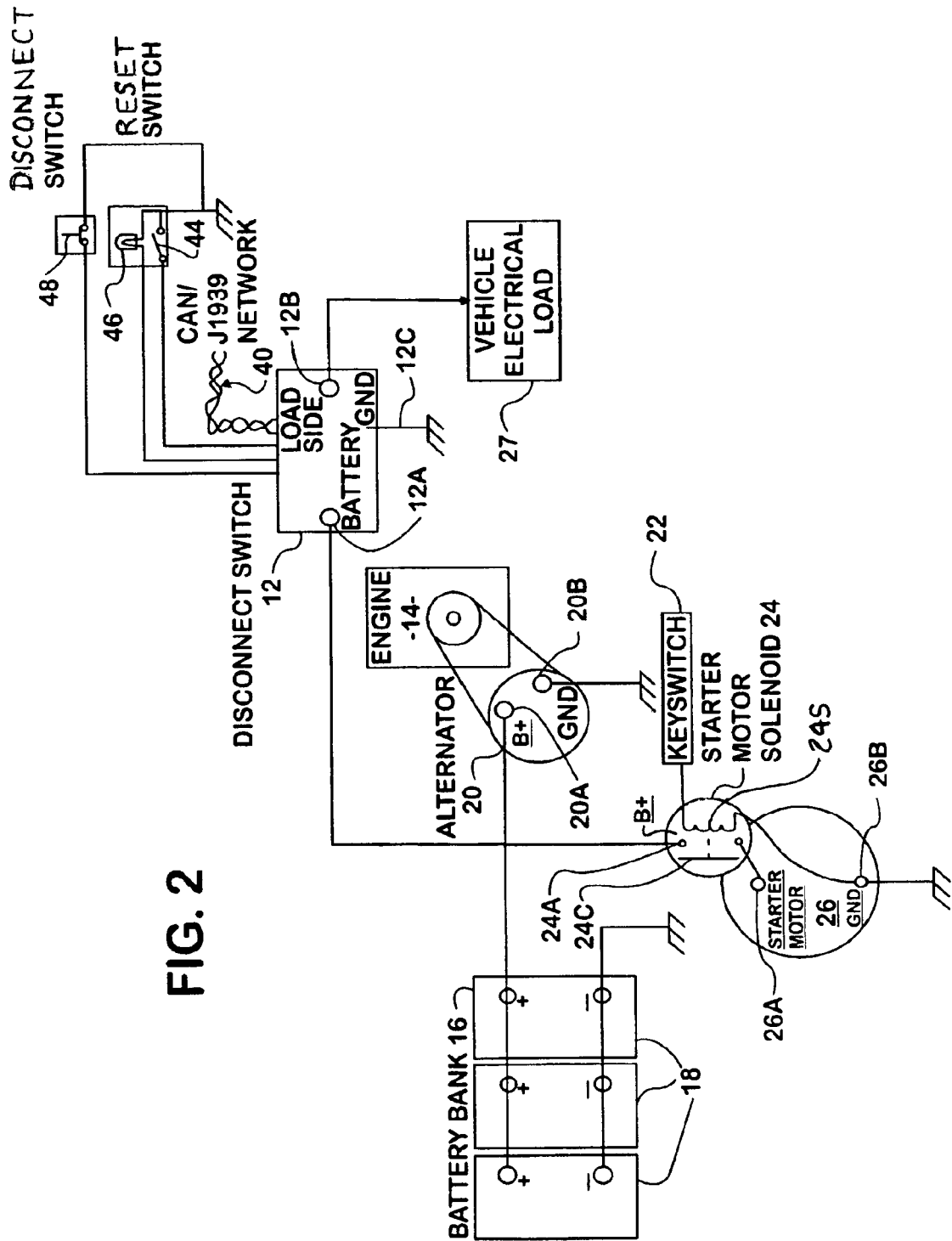
FIG. 2 is a schematic electric circuit diagram of a second embodiment.

The embodiment of FIG. 2, which uses the same reference numerals to designate the same elements as in FIG. 1, differs from that of FIG. 1 only in that alternator terminal 20A is connected to the battery side terminal 12A of switch module 12 instead of to the load side terminal 12B.

Figure 3:
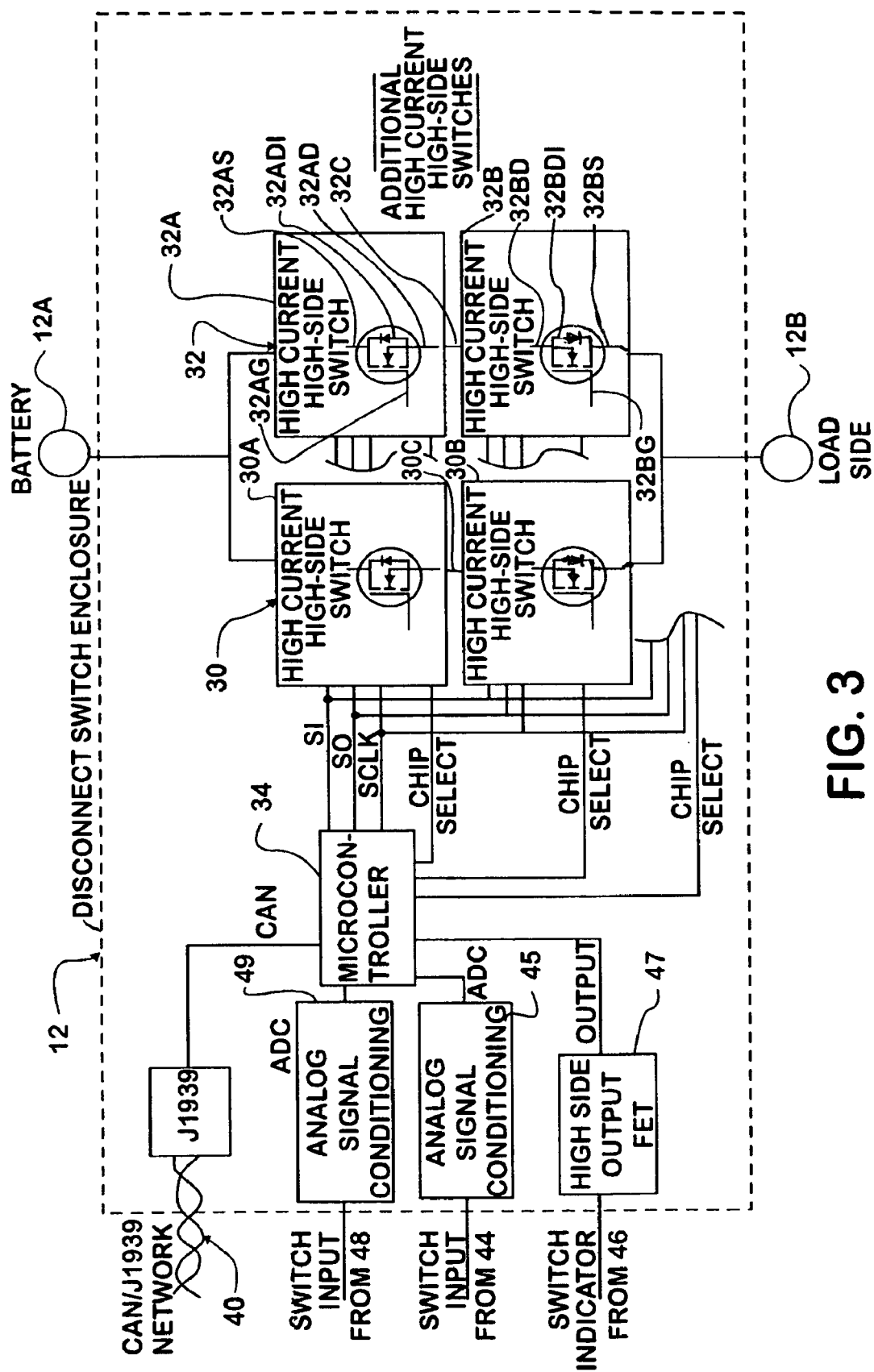
FIG. 3 is a more detailed electric circuit diagram of battery disconnect switches present in the embodiments of FIGS. 1 and 2.

FIG. 3 shows detail of the solid-state switch devices of electronic disconnect switch module 12. This particular example uses four solid-state devices 30A, 30B, 32A, and 32B. Each device is a high-current, high-side switch, a specific example of which was mentioned earlier. Devices 30A, 30B are arranged to form one solid-state switch element 30, and devices 32A, 32B to form a second solid-state switch element 32 that is in parallel with the first. Each switch element is connected between terminals 12A and 12B. Additional pairs of switch devices, not specifically shown, may be added to increase the current rating of the switch module.

Figure 5:
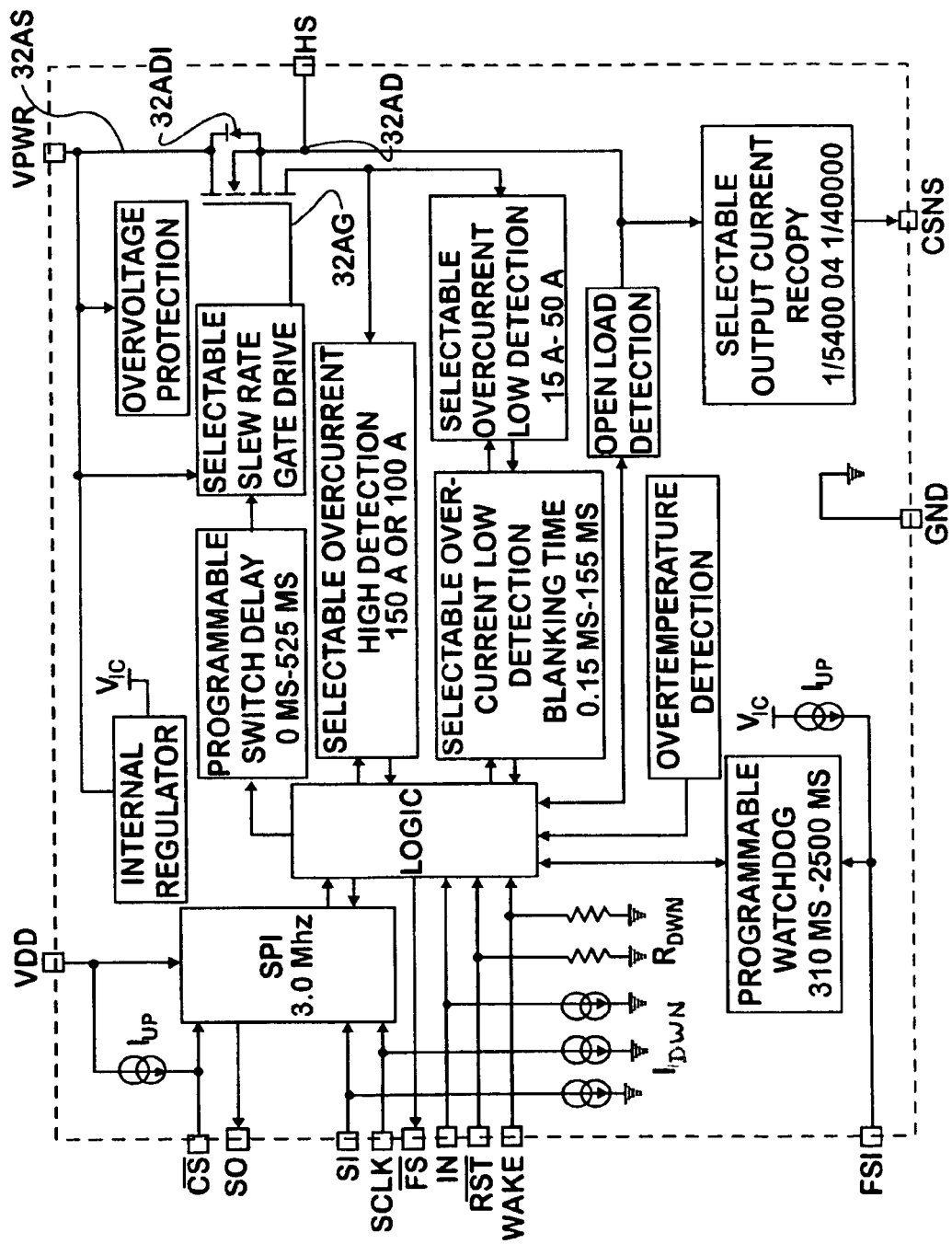
FIG. 5 is a detailed block diagram of elements internal to an exemplary high-current, high-side switch used in the inventive battery disconnect switch.

The four devices 30A, 30B, 32A, and 32B are identical, and detail of the internal construction of each is shown in FIG. 5, using device 32A as the example. One of the internal elements is a solid-state switch that comprises a source terminal 32AS, a drain terminal 32AD, and a gate terminal 32AG. A junction forming a diode 32ADI is present between the source and drain terminals.

Two devices, such as 32A and 32B, form a switch element (element 32) by connecting the drain terminals in common, as by a connection 32C in FIG. 3. One source terminal, such as 32AS, is connected to terminal 12A, and the other source terminal 32BS is connected to terminal 12B. As many pairs of devices as are needed to handle the load capacity of the electrical system are used in any given disconnect switch, two pairs being the number in this particular example. Devices 30A and 30B are connected in the same way with a connection 30C connecting the drains in common.

A processor, such as microcontroller 34 in FIG. 3, is associated with switch elements 30, 32 in module 12 for both control and information transmission purposes grouped for convenience into the four feature groups referred to above: Vehicle Electrical System Protection; Battery Charge Control; Battery Disconnect; and Battery Monitoring. Microcontroller 34 communicates with various vehicle electrical subsystems, such as an electronic gauge cluster (EGC) 35, a Vehicle Body Controller 36, and Aware™ Module 38, via a data link 40 as particularly shown in FIG. 4.

Figure 4:
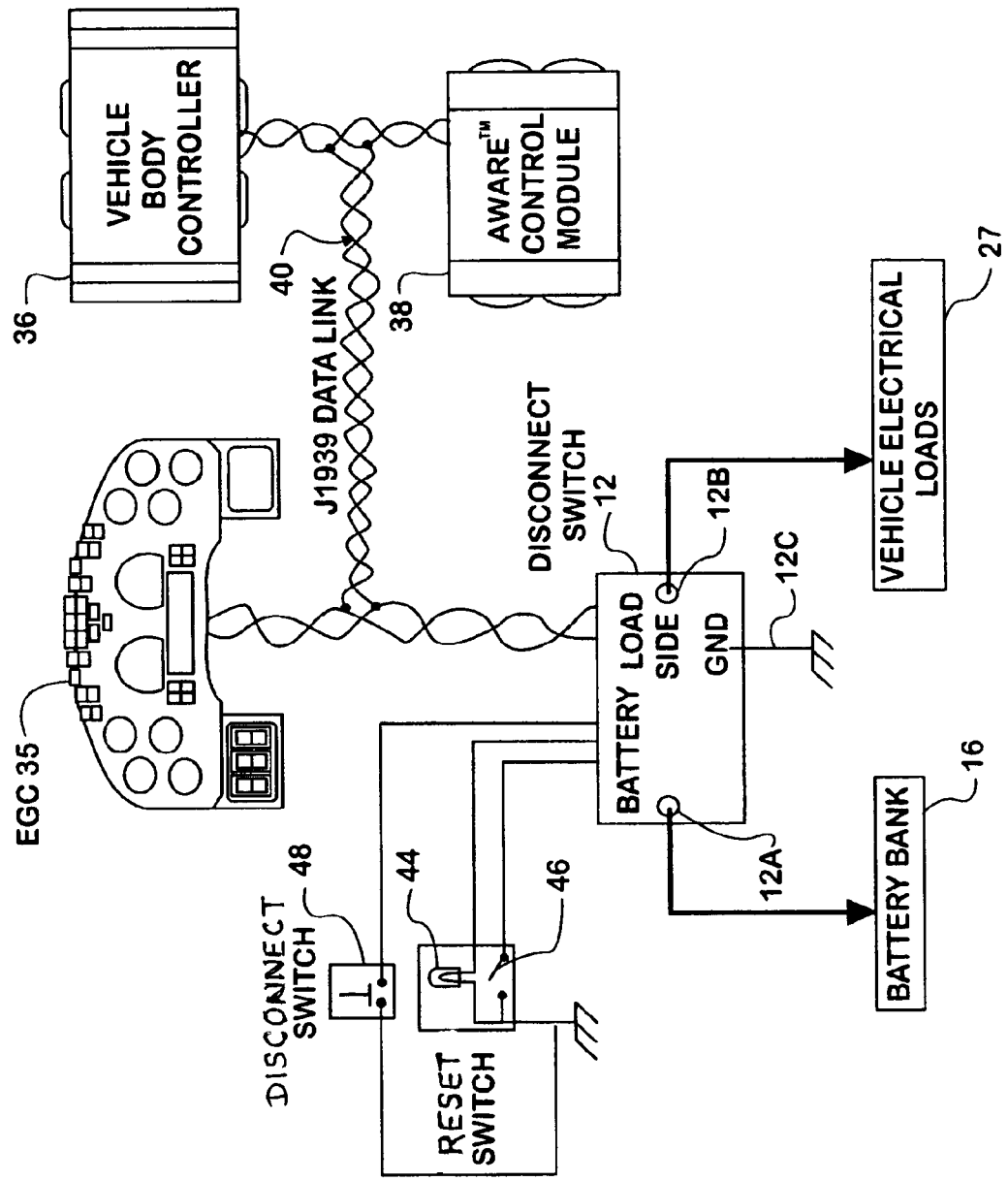
FIG. 4 is an electric circuit diagram that shows additional portions of the vehicle electrical system in association with the disconnect switches.

FIGS. 1, 2, and 4 show a reset switch 44 and an indicator 46 associated with disconnect switch module 12. Switch 44 is connected to one of the inputs of module 12. Indicator 46 is connected to an output of module 12 and can be, for example, an LED that is integrated with switch 44. A manual disconnect switch 48 is connected to the other input of module 12, enabling module 12 to act as a Master Disconnect Switch specified by certain industry standards. FIGS. 1, 2, 3, and 4 show the data link to be an SAE J1939 data link. Additionally, FIG. 3 shows that the manual disconnect input from switch 48 is conditioned by an analog signal conditioning function 49 in module 12, that the reset switch input is conditioned by an analog signal conditioning function 45, and that it is via a high side output FET 47 that indicator 46 is operated. Reset switch 44, when operated by the driver of the vehicle after observing that indicator 46 is illuminated, can power up the vehicle electrical system after module 12 has disconnected the vehicle battery bank because a low battery charge condition has been detected. It is assumed that the battery bank still can supply enough electricity for resetting the disconnect switch module. FIG. 3 also shows that microcontroller 34 has communication with the individual devices 30A, 30B, 32A, 32B via channels designated SI, SO, SCLK, and CHIP SELECT. Interface to the microcontroller utilizes the industry standard synchronous serial peripheral interface (SPI) bus. This bus consists of four control lines from the microcontroller to each high side switch:

The SI channel is used to transfer data from the master (microcontroller) to the slave (switch). The SO channel is used to transfer data from the slave to the master. The SCLK channel is used as a common clock source between the two devices, generated by the master. The control channels, SI, SO, and SCLK are common to all high side switches.

The CHIP SELECT channel is used by the master to initiate communications with a slave. Slaves will not communicate on the bus unless their chip select line is in the proper state. The chip select line is exclusive to each high side switch allowing the microcontroller to communicate with each switch individually.

The SPI bus interface to the switch is used primarily for control, configuration and diagnostics. Control of the switch is mainly used to enable or disable the switch (on or off commands). Configuration of the switch would include programming parameters into the switch to enable current limit trip levels, slew rates and others. Diagnostic information from the switch includes overcurrent, open or shorted load, and others.

The Vehicle Electrical System Protection (VESP) feature group serves to protect any electrical circuit or component that is connected to the load side of module 12 from reverse battery connection and certain jump-start conditions.

In a "reverse battery" condition, module 12 will disconnect the vehicle battery bank from the vehicle electrical loads to prevent battery voltage from being applied across electrical components connected to load terminal 12B. The module contains appropriate power supply circuitry so that it may remain powered during a "reverse battery" condition in order to monitor the continued presence of the "reverse battery" condition and to report the duration of the condition, when a request is issued on data link 40 to microcontroller 34. Once the reverse battery event has been removed, the disconnect switch will connect the vehicle battery bank back to the vehicle electrical loads.

Disconnect switch module 12 also protects any electrical circuit or component connected to load terminal 12B during a "double battery" jump-start condition. Such a condition is created by connecting two nominal 12 VDC batteries in series to create a nominal 24 VDC voltage source and then connecting the 24 VDC source to between terminal 12A and ground.

A "double-battery" jump-start might be used in an attempt to start a vehicle with depleted battery power.

Module 12 inherently provides protection against overvoltage created by a "double battery" connection. Microcontroller 34 has the ability to process data corresponding to the "double battery" voltage being applied and to develop data for pulse width modulation (PWM) of that voltage via the switching capabilities of the high-current, high-side semiconductor switches forming switch elements 30, 32. The processing and PWM capabilities of microcontroller 34 are used to cause the switch elements 30, 32 to pulse width modulate the "double battery" voltage so that the root mean square (RMS) voltage at load terminal 12B corresponds to nominal 14.2 VDC. Controlling the RMS voltage enables disconnect switch module 12 to effectively regulate the DC voltage level applied to electrical loads to a level that avoids undesired overvoltage.

Figure 6A:
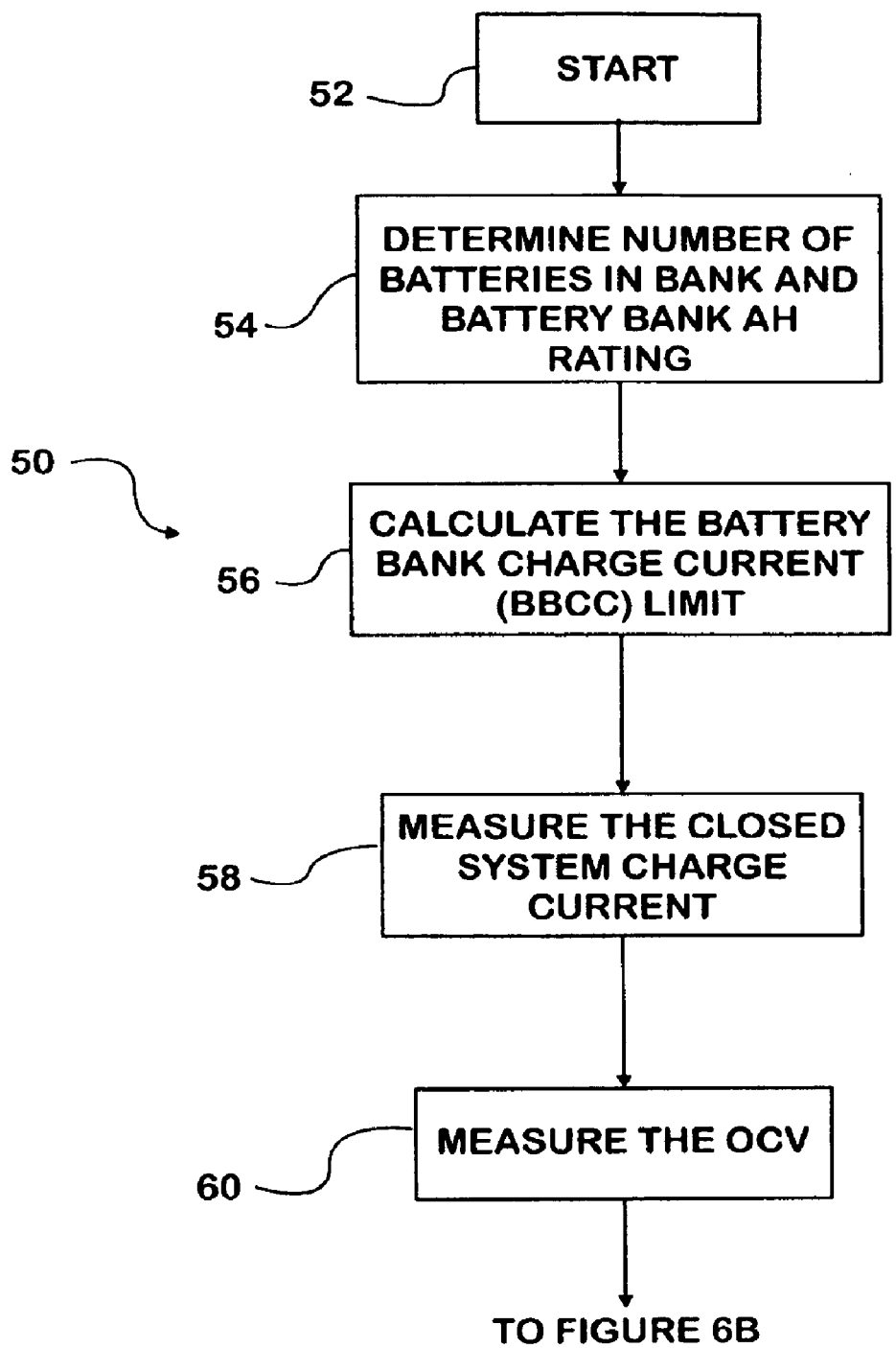
FIGS. 6A and 6B together comprise a flow diagram for an algorithm that is used with the Battery Charge Control feature group.
Figure 6B:
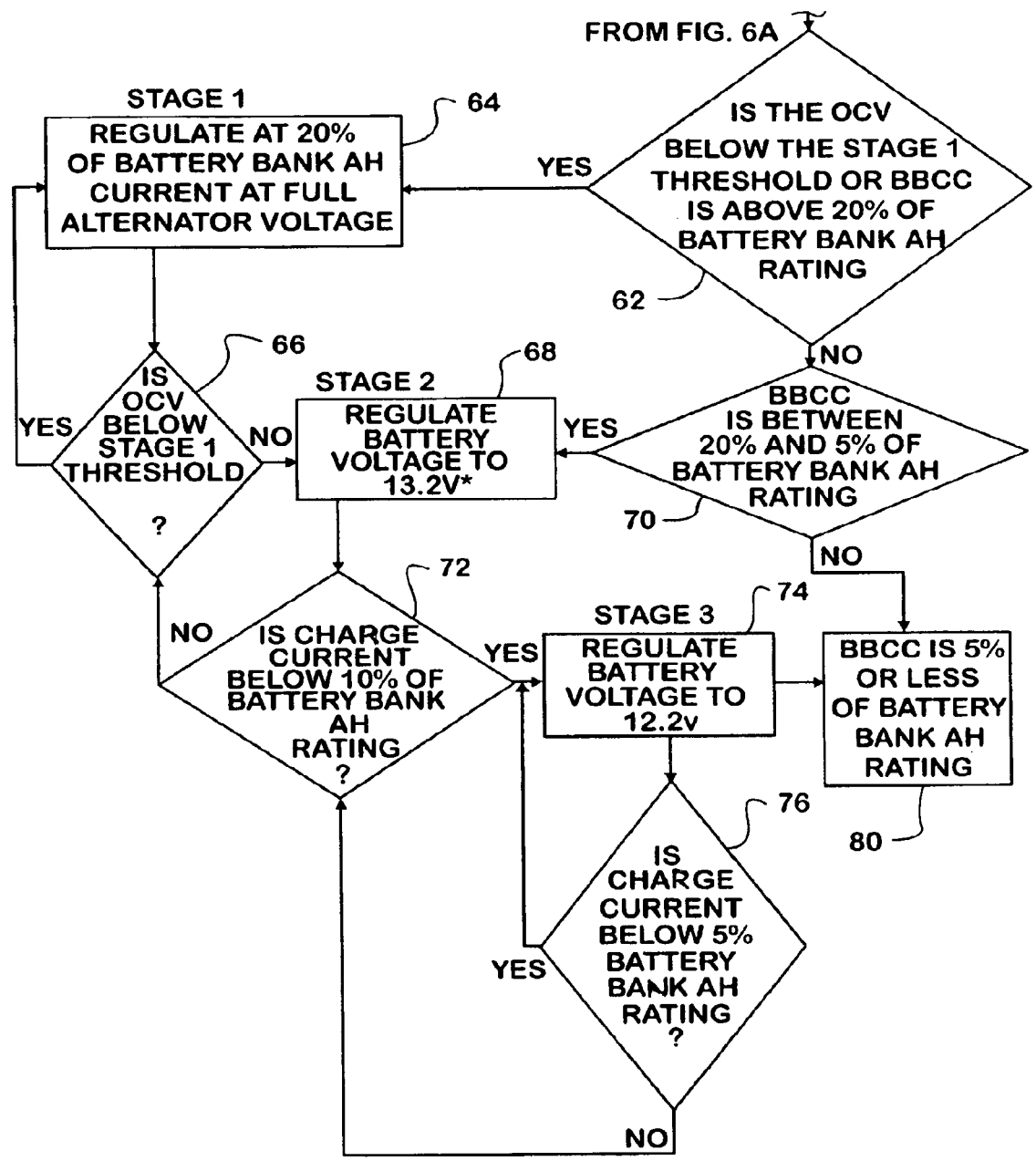

The Battery Charge Control feature group utilizes the algorithm 50 shown in FIGS. 6A and 6B. The algorithm is programmed in microcontroller 34 and iterates from time to time beginning at a start point 52. A step 54 first determines the number of "Group 31" batteries 18 in battery bank 16 and the total ampere-hour (AH) capacity of the battery bank. The number of batteries in the bank and the battery ampere-hour capacity are programmed parameters that are programmed in the vehicle body controller 36, the programming typically taking place on a production line where the vehicle is being assembled. The vehicle body controller can then present the programmed data to microcontroller 34 via the SAE J1939 data link 40.

A step 56 calculates a battery bank charge current (BBCC) limit. For example, maximum ampere-hour charge current may be limited to 20% of the total ampere-hour rating of the battery bank. If the battery bank contained four "Group 31" batteries each rated at 100 ampere-hours, the total ampere-hour rating of the bank would be 400 ampere-hours. At a 20% limit, the maximum charge current allowed to be delivered to the battery bank would be 80 amperes.

Once the maximum allowable BBCC has been determined, a step 58 measures the Closed System Charge Current (CSCC) and a step 60 measures the Open Circuit Voltage (OCV). The CSCC is the current that in the closed system is produced by alternator 20, passes through disconnect switch module 12, and enters battery bank 16 to charge batteries 18. The OCV is the voltage measured by momentarily operating disconnect switch module 12 to momentarily disconnect battery bank 16 from the vehicle electrical system, and during disconnection, measuring the no-load voltage of the battery bank. Microcomputer 34 monitors the charge/discharge current level, OCV level, and percentage to which the battery bank is considered fully charged.

Using that data and the programmed data, microcomputer 34 performs calculations for determining which of three stages describes the present condition of battery bank 16: Stage 1 (Bulk), Stage 2 (Absorption), or Stage 3 (Maintenance/Float). The determination uses what is essentially a decision tree, a brief overview of which will be given before discussing details of the algorithm of FIGS. 6A and 6B that implements the decision process.

A first decision involves evaluating the battery bank voltage relative to a threshold and the charge current relative to a maximum limit. The results of those evaluations determine if the battery bank condition is Stage 1 or alternatively another stage. If they indicate the Stage 1 condition, a certain type of regulation ensues.

If Stage 1 is not indicated, a second decision has to be made, and it involves evaluating the battery bank charge current to ascertain if it is within a 5%-20% range of the battery bank ampere-hour rating calculated by step 54. If it is, then the Stage 2 condition is indicated, and another type of regulation ensues. If it isn't. a Stage 3 condition is indicated by default.

Detailed Description of Stage 1

A step 62 determines if OCV is below a Stage 1 threshold voltage (a voltage that is a programmable parameter for the vehicle) or if BBCC is above 20% of the battery bank ampere-hour rating. If OCV is below that threshold and BBCC is not above 20% of the battery bank ampere-hour rating, a step 62 results in microcomputer 34 operating switch 12 in a manner that regulates the charge current from alternator 20 to battery bank 16 to ensure that the BBCC maximum limit is not exceeded. In this stage, switch 12 does not regulate battery bank voltage, and so the battery bank voltage will be approximately equal to the output voltage of alternator 20. Periodically microcomputer 34 will check OCV (step 66). As long as OCV remains below the Stage 1 threshold, Stage 1 condition continues to be indicated and steps 64 and 66 repeatedly iterate.

Detailed Description of Stage 2

However, when step 66 discloses that OCV is not below the Stage 1 threshold voltage, a Stage 2 condition is indicated. Microcomputer 34 will then begin to operate switch 12 to regulate the battery bank voltage to the Stage 2 regulation level of 13.2V (a voltage level that is also a programmable parameter for the vehicle). Such operation is indicated by step 68 in FIG. 6B. Depending on the alternator output voltage, the voltage supplied to battery bank 16 could be lower than 13.2 VDC but will never be greater than 13.2 VDC. In other words, disconnect switch 12 is not to be operated to function as a boost regulator.

Had step 62 determined that OCV was not below the Stage 1 threshold voltage and that BBCC was not above 20% of the battery bank ampere-hour rating, a step 70 would have determined if BBCC was within the 5%-20% range of the battery bank ampere-hour rating calculated by step 54, and if so the Stage 2 condition would have been indicated, with step 68 being performed. (If not, the Stage 3 default state would be indicated—reference numeral 80).

Upon indication of the Stage 2 condition and ensuing regulation of battery bank voltage to 13.2 VDC, a step 72 determines if BBCC is less than some percentage (10% in this example) of the ampere-hour rating of the battery bank. If BBCC is not less than that percentage, the algorithm executes step 66 which then determines whether the battery bank is in Stage 1 or Stage 2 condition, with regulation continuing as previously described, depending on whether the Stage 1 or the Stage 2 condition has been indicated.

Detailed Description of Stage 3

If step 72 had determined that BBCC was below 5% of the ampere-hour rating of the battery bank, Stage 3 would have been indicated by default, and battery bank voltage would as a result have been regulated to a further reduced voltage of 12.2 VDC (also a programmable parameter) as indicated by a step 74. Once regulation at the reduced level of 12.2 VDC has commenced, a step 76 determines if charge current has continued to remain below 5% of the ampere-hour rating of the battery bank voltage. If so, regulation at the 12.2 VDC level continues and step 76 is repeated. The voltage supplied to the battery bank could be lower than 12.2 VDC but is not allowed to exceed 12.2 VDC. If BBCC rises to at least the 5% level, then step 72 determines if the level has returned to at least the 10% level. In this way, the Stage 3 condition continues to be indicated until the 10% level is again reached after which step 66 occurs.

The Battery Disconnect feature group is used to disconnect the vehicle battery bank from the vehicle electrical system. The trigger mechanism for this feature is either automatic or manual. In either case, disconnection is accomplished by turning off the high-current, high-side semiconductor devices 30, 32 of disconnect switch module 12 such that current is not allowed to flow from battery terminal 12A to load terminal 12B.

Automatic disconnection is defined as disconnect switch module 12 itself disconnecting the battery bank from the vehicle electrical system. While engine 14 is off, i.e. not running, disconnect switch module 12 monitors the battery voltage of battery bank 16 through a software low pass filter. If the voltage decreases below a programmable threshold level, disconnect switch module 12 automatically disconnects battery bank 16 from the vehicle electrical loads 27 to prevent further drain of the battery bank. Once in this state, disconnect switch module 12 signals the vehicle driver that battery bank 16 has been disconnected from the vehicle electrical loads by periodically flashing indicator 46 inside reset switch 44. If reset switch 44 is pressed or closed by the vehicle driver, disconnect switch module 12 re-connects battery bank 16 to the vehicle electrical loads. Alternatively, module 12 re-connects the battery bank when engine is started and running. Automatic disconnection can also be a result of a J1939 message from another module such as the International Aware™ module. This message could be used as a battery disconnect theft deterrent feature. Manual disconnection is performed by operation of switch 48. At any time when engine 14 is off and not running, the driver can manually disconnect the battery bank by pressing manual disconnect switch 48. This feature is most useful for a service technician who needs to remove battery power from the electrical system for service purposes. This feature is useful in emergency vehicles, for which applicable electrical system standards require a battery disconnect switch that is operated by the vehicle driver.

The Battery Monitoring features group uses the algorithm method described in U.S. Pat. No. 6,417,668 to determine battery bank condition.

The invention is believed to provide an improvement that possesses attributes not heretofore contemplated for battery disconnect switches in motor vehicles. While the invention provides the basic function of avoiding unintended battery draining in a motor vehicle when parked for an extended period of time, it provides the added functions mentioned earlier in connection with the four named feature groups.

While a presently preferred embodiment of the invention has been illustrated and described, it should be appreciated that principles of the invention are applicable to all embodiments that fall within the scope of the following claims.

What is claimed is:

1. A disconnect switch module for disconnecting a battery bank from an electrical load upon occurrence of certain conditions, the module comprising one or more pairs of high-current, high-side solid state switch devices, the devices of each pair each comprising a solid-state switch comprising a source terminal and a drain terminal providing a conduction path through the switch, the source terminal of one device of each pair being connected to the load circuits, the source terminal of the other device of each pair being connected to the battery bank, and the drain terminals of the devices of each pair being connected in common further comprising a processor that is associated with each solid-state switch and that comprises an algorithm for processing data corresponding to battery bank voltage for causing the solid-state switches to disconnect the battery bank from the electrical load when data corresponding to battery bank voltage indicates that a battery has been connected in the battery bank to create a double battery.

2. The combination of a battery bank comprising one or more D.C. storage batteries, an electrical load circuit, and a disconnect switch module for disconnecting the battery bank from the electrical load circuit upon occurrence of certain conditions, the disconnect switch module comprising one or more pairs of high-current, high-side solid state switch devices, the devices of each pair each comprising a solid-state switch comprising a source terminal and a drain terminal providing a conduction path through the switch, the source terminal of one device of each pair being connected to the electrical load circuit, the source terminal of the other device of each pair being connected to the battery bank, and the drain terminals of the devices of each pair being connected in common and further comprising a processor that is associated with each solid-state switch and that comprises an algorithm for processing data corresponding to battery bank voltage for causing the solid-state switches to disconnect the battery bank from the electrical load circuit when data corresponding to battery bank voltage indicates that a battery has been connected in the battery bank to create a double battery.

3. The combination set forth in claim 2 further comprising a processor that is associated with each solid-state switch and that comprises an algorithm for processing data relevant to operation of the disconnect switch module and for developing, from processed data, control data for controlling the solid-state switches.

4. The combination set forth in claim 3 wherein the data relevant to operation of the disconnect switch module includes data representing a) the magnitude and direction of electric current flow through the disconnect switch module with respect to the battery bank, and b) the open circuit voltage of the battery bank.

5. The combination set forth in claim 4 wherein the control data for controlling the disconnect switch module is developed by also processing programmed data defining the number of batteries in the battery bank and the ampere-hour rating of each battery in the battery bank.

6. The combination set forth in claim 3 wherein the processor comprises an algorithm that when executed, develops data that causes either a) limiting battery bank charge current to a defined charge current limit without regulating battery bank voltage, b) regulating battery bank voltage to a first defined limit of regulation when charge current is within a defined range immediately below the defined charge current limit, or c) regulating battery bank voltage to a second defined limit of regulation that is less than the first defined limit of regulation when charge current is less than the defined range.

7. The combination set forth in claim 3 further comprising an indicator operable by the module for disclosing that the module has disconnected the electrical load from the battery bank, a person-operated reset switch, and wherein the module comprises a reset input to which the reset switch is connected for resetting the module from a disconnected state to a connected state in response to operation of the reset switch.

8. The combination set forth in claim 3 further comprising a person-operated switch, and wherein the module comprises an input to which the person-operated switch is connected for switching the module from a connected state to a disconnected state in response to operation of the person-operated switch.

9. The combination as set forth in claim 2 further comprising a processor that is associated with each solid-state switch and that comprises an algorithm for processing data corresponding to battery bank voltage for causing the solid-state switches to disconnect the battery bank from the electrical load when data corresponding to battery bank voltage indicates battery bank voltage has dropped below a low voltage threshold.

10. The combination as set forth in claim 2 further comprising a processor that is associated with each solid-state switch and that comprises an algorithm for processing data corresponding to battery bank voltage for causing the solid-state switches to disconnect the battery bank from the electrical load circuit when data corresponding to battery bank voltage indicates a reversed polarity battery in the battery bank.

* * * * *